US012675683B2

(12) United States Patent
Chen et al.

(10) Patent No.: US 12,675,683 B2
(45) Date of Patent: Jul. 7, 2026

(54) AUTOMATED DEEP LEARNING ARCHITECTURE SELECTION FOR TIME SERIES PREDICTION WITH USER INTERACTION

(71) Applicant: International Business Machines Corporation, Armonk, NY (US)

(72) Inventors: Bei Chen, Blanchardstown (IE); Dakuo Wang, Cambridge, MA (US); Martin Wistuba, Dublin (IE); Beat Buesser, Ashtown (IE); Long Vu, Chappaqua, NY (US); Chuang Gan, Cambridge, MA (US); Mathieu Sinn, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 17/106,966

(22) Filed: Nov. 30, 2020

(65) Prior Publication Data

US 2022/0172038 A1 Jun. 2, 2022

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC .......... G06N 3/08; G06N 3/045; G06N 3/044; G06N 3/086
See application file for complete search history.

(56) References Cited

U.S. PATENT DOCUMENTS 5,461,699 A    10/1995 Arbabi et al.
6,735,580 B1    5/2004 Li et al.
(Continued)

FOREIGN PATENT DOCUMENTS

CN    104021432 A    9/2014
CN    104850891 A    8/2015
(Continued)

OTHER PUBLICATIONS

Authors: Fawaz et al. Title: Transfer learning for time series classification Publication Date: Nov. 5, 2018 (Year: 2018).*
(Continued)

*Primary Examiner* — David Yi
*Assistant Examiner* — Amy Tran
(74) *Attorney, Agent, or Firm* — Scully, Scott, Murphy & Presser, P.C.; Yuanmin Cai

(57) ABSTRACT

A system and method for automatically generating deep neural network architectures for time series prediction. The system includes a processor for: receiving a prediction context associated with a current use case; based on the associated prediction context, selecting a prediction model network configured for a current use case time series prediction task; replicating the selected prediction model network to create a plurality of candidate prediction model networks; inputting a time series data to each of the plurality of the candidate prediction model network; train, in parallel, each respective candidate prediction model network of the plurality with the input time series data; modifying each of the plurality of the candidate prediction model network by applying a respective different set of one or more model parameters while being trained in parallel; and determine a fittest modified prediction model network for solving the current use case time series prediction task.

20 Claims, 13 Drawing Sheets

(56) References Cited

U.S. PATENT DOCUMENTS

| | | | |
|---|---|---|---|
| 10,417,556 | B1 | 9/2019 | Fairbank et al. |
| 10,496,927 | B2 * | 12/2019 | Achin .................... G06N 20/10 |
| 10,541,822 | B2 | 1/2020 | Brunn et al. |
| 10,671,931 | B2 | 6/2020 | Bansal et al. |
| 10,755,164 | B2 | 8/2020 | Osogami et al. |
| 10,783,399 | B1 | 9/2020 | Bruno et al. |
| 11,057,230 | B2 | 7/2021 | Brunn et al. |
| 11,270,190 | B2 | 3/2022 | Zhong et al. |
| 12,014,257 | B2 | 6/2024 | Merity et al. |
| 2016/0099010 | A1 | 4/2016 | Sainath et al. |
| 2018/0047389 | A1 | 2/2018 | Song et al. |
| 2018/0253637 | A1 | 9/2018 | Zhu et al. |
| 2018/0300621 | A1 | 10/2018 | Shah et al. |
| 2019/0103982 | A1 | 4/2019 | Brunn et al. |
| 2019/0147125 | A1 | 5/2019 | Yu et al. |
| 2019/0385055 | A1 | 12/2019 | Sim |
| 2020/0084055 | A1 | 3/2020 | Brunn et al. |
| 2020/0134461 | A1 | 4/2020 | Chai et al. |
| 2020/0151500 | A1 | 5/2020 | Kossyk et al. |
| 2020/0184380 | A1 * | 6/2020 | Thomas ................. G06N 3/063 |
| 2020/0242483 | A1 | 7/2020 | Shashikant Rao et al. |

FOREIGN PATENT DOCUMENTS

| | | | |
|---|---|---|---|
| CN | 109214566 A | 1/2019 | |
| CN | 109255505 A | 1/2019 | |
| CN | 109472110 A | 3/2019 | |
| CN | 109961177 A | 7/2019 | |
| CN | 111756719 A | 10/2020 | |
| CN | 116438555 A | 7/2023 | |
| DE | 112021006215 T5 | 9/2023 | |
| GB | 2616770 A | 9/2023 | |
| JP | 2017-520068 A | 7/2017 | |
| JP | 2018-195314 A | 12/2018 | |
| JP | 2020-508521 A | 3/2020 | |
| JP | 2020-526855 A | 8/2020 | |
| JP | 2023-550959 A | 12/2023 | |
| WO | 2015/179778 A1 | 11/2015 | |
| WO | 2018/156942 A1 | 8/2018 | |
| WO | WO-2019152929 A1 * | 8/2019 | .............. G06N 3/04 |
| WO | 2022/112895 A1 | 6/2022 | |

OTHER PUBLICATIONS

Authors: Veniat et al Title: Stochastic Adaptive Neural Architecture Search for Keyword Spotting Publication Date: Apr. 17, 2019 (Year: 2019).*

Authors: Widodo & Budi Title: Model selection using dimensionality reduction of time series characteristics Date: 2013 (Year: 2013).*

Authors: Martin Wistuba Title: Deep Learning Architecture Search by Neuro-Cell-Based Evolution with Function-Preserving Mutations Date: Jan. 23, 2019 (Year: 2019).*

Kouassi et al., "An Analysis of Deep Neural Networks for Predicting Trends In Time Series Data", arXiv: 2009.07943v2 [cs.LG] Sep. 22, 2020, 23 pages.

Bouktif et al., "Optimal Deep learning LSTM Model For Electric Load Forecasting Using Feature Selection and Genetic Algorithm: Comparison With Machine Learning Approaches", Energies 2018, 11, 1636; Accepted: May 21, 2018; Published: Jun. 22, 2018; pp. 1-20.

Sagheer et al., "Unsupervised Pre-Training of a Deep LSTM-Based Stacked Autoencoder for Multivariate Time Series Forecasting Problems", www.nature.com, Scientific Reports (2019) 9:19038, Dec. 2019, 16 pages.

Li et al., "Deep Transfer Learning for Time Series Data Based on Sensor Modality Classification", www.mdpi.com, Sensors 2020, 20, 4271; Accepted: Jul. 28, 2020; Published: Jul. 31, 2020, 25 pages.

Livieris et al., "Ensemble Deep Learning Models for Forecasting Cryptocurrency Time-Series", www.mdpi.com, Algorithms 2020, 13, 121; Accepted: May 8, 2020; Published: May 10, 2020, 21 pages.

International Search Report and Written Opinion dated Jan. 28, 2022 from related PCT/IB2021/060490.

Deep learning in Time Series, Retrieved from: https://github.com/chuanyun/Deep-Learning-in-Time-Series, 2018, 2 pages.

Gamboa, J., et al., Deep Learning for Time-Series Analysis, arXiv:1701.01887v1 [cs.LG], Jan. 7, 2017, 13 pages.

H2O AutoML: Automatic Machine Learning, Retrieved from: https://docs.h2o.ai/h2o/latest-stable/h2o-docs/automl.html, Nov. 2, 2024, 23 pages.

Japan Patent Office, "Notice of Reasons for Refusal" Mar. 4, 2025, 13 Pages, JP Application No. 2023-530879.

Lim, et al., "Time Series Forecasting with Deep Learning: A Survey", Phil. Trans. R. Soc. Feb. 15, 2021, 14 pages.

Pham, et al., Efficient Neural Architecture Search via Parameter Sharing, arXiv:1802.03268v2 [cs.LG] Feb. 12, 2018, 11 pages.

Rangapuram, et al., "Deep State Space Models for Time Series Forecasting", Retrieved from: https://github.com/Alro10/deep-learning-time-series , 2018, 28 pages.

Seiichi Ozawa, et al., "An Architecture Design Method of Modular Dynamical Neural Networks Using Genetic Algorithms", Transactions of the Society of Instrument and Control Engineers, vol. 36,No. 3, , 2000. , pp. 298-305.

Use The Sagemaker Ai Deepar Forecasting Algorithm, Retrieved from: https://docs.aws.amazon.com/sagemaker/latest/dg/deepar.html, 2025, 13 pages.

What is automated machine learning (AutoML)?, Retrieved from: https://learn.microsoft.com/en-us/azure/machine-learning/concept-automated-ml?view=azureml-api-2, Aug. 28, 2024, 10 pages.

Yohei Yamasaki, et al., "Interpretation trial of Nephrosis prediction model based on deep learning with clinical time-series data", Proceedings of The 38th Joint Conference on Medical Informatics (19th Japan Association for Medical Informatics Academic Conference) , Japan Association for Medical Informatics, 2018 , p. 774-777.

Fusi et al. "Probabilistic Matrix Factorization for Automated Machine Learning", arXiv:1705.05355v2 [stat. ML], May 1, 2018, 14 pages.

Hospedales et al. "Meta-Learning in Neural Networks: A Survey", arXiv:2004.05439v2 [cs.LG], Nov. 7, 2020, 20 pages.

* cited by examiner

<u>200</u>

Figure 6:
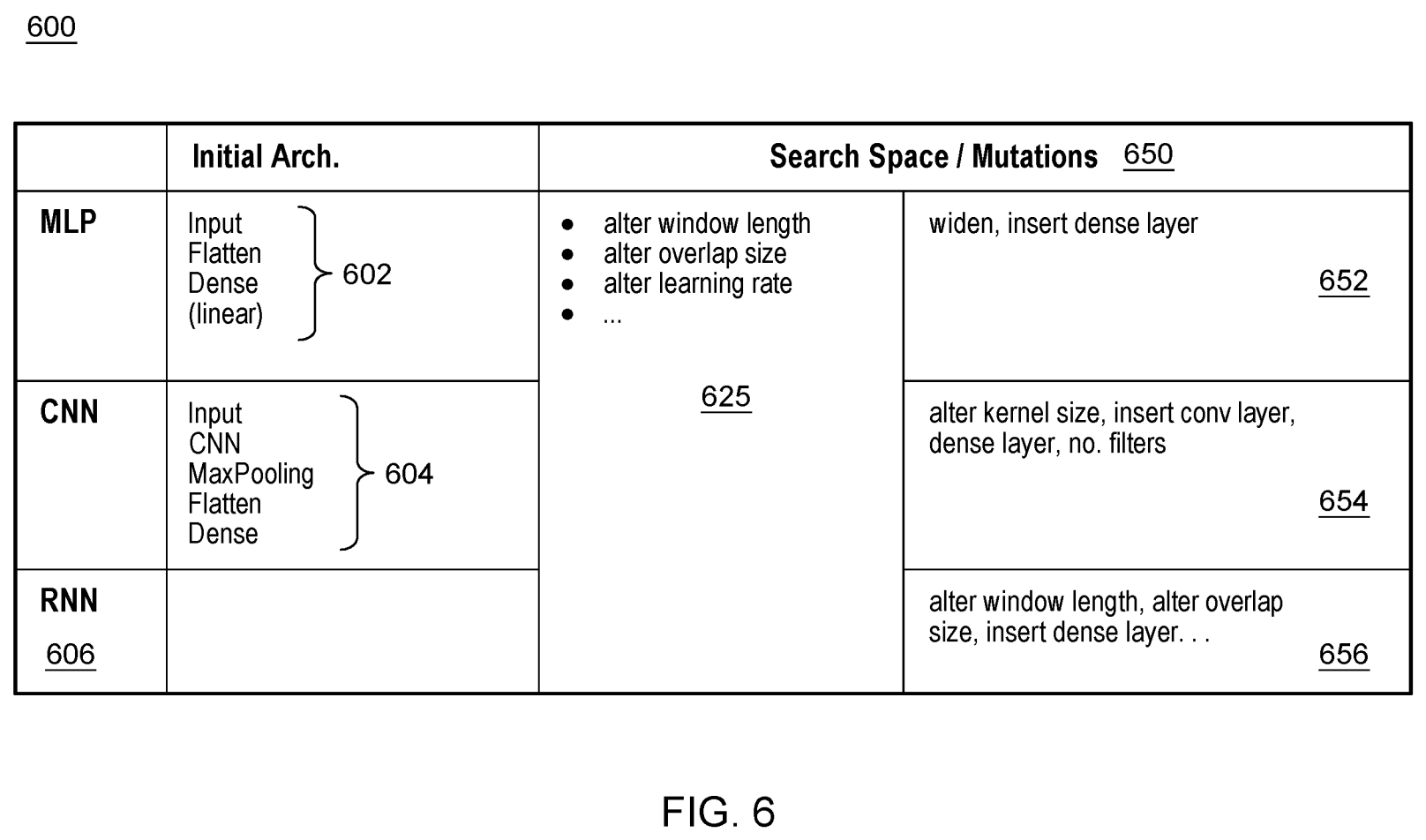

600

| | Initial Arch. | Search Space / Mutations  650 | |
|---|---|---|---|
| MLP | Input<br>Flatten<br>Dense<br>(linear) ⎬ 602 | • alter window length<br>• alter overlap size<br>• alter learning rate<br>• ...<br><br>625 | widen, insert dense layer<br><br>652 |
| CNN | Input<br>CNN<br>MaxPooling<br>Flatten<br>Dense ⎬ 604 | | alter kernel size, insert conv layer,<br>dense layer, no. filters<br><br>654 |
| RNN<br>606 | | | alter window length, alter overlap<br>size, insert dense layer. . .<br><br>656 |

Pipeline candidates

| Name | Algorithm |
|------|-----------|
| ⌄ Pipeline D | ○ Auto Regressor |
| ⌄ Pipeline H | ○ XGBoost |
| ⌄ Pipeline O | ○ Holt-Wilter |
| ⌄ Pipeline F | ○ Profit loss AutoML TS |

AUTOMATED DEEP LEARNING ARCHITECTURE SELECTION FOR TIME SERIES PREDICTION WITH USER INTERACTION

FIELD

The present invention relates to Automated Machine Learning (AutoML) and cloud computing, and particularly methods and systems for automatically analyzing time series data for building and deploying time-series prediction models.

BACKGROUND

Many types of science and business data include time series data, e.g., IoT, Retail, Transportation, Energy/renewable energy. Time series data share similar characteristics: multi-level seasonality, highly correlated features, noisy, and large volume.

Currently, use of Deep Neural Networks (DNN) has demonstrated higher accuracy for many complex time series data prediction applications, particularly when the multi-level seasonalities are not easily separable.

Additionally, there exists cloud-based service entities provide on-line provisioning of computing resources as services, in particular, cloud-based AutoML (auto machine learning) services where artificial intelligence or machine learned models are generated and built by and for end use customers.

SUMMARY

The following summary is merely intended to be exemplary. The summary is not intended to limit the scope of the claims.

According to an aspect, a system and method is provided for a cloud-based service provider to automatically build and deploy cloud-based time-series prediction models.

According to a further aspect, a system and method is provided for building an automated DNN architecture selection method and system for time series prediction with user interaction. In an embodiment, the automated DNN architecture selection method and system for time series prediction is an extension to an automated machine learning system for time series and tools which enable the creation of time series prediction pipeline in a fully automated way.

According to one aspect, there is provided a computer-implemented method for automatically synthesizing optimized deep neural network architectures for time series prediction. The method comprises: receiving, at a hardware processor, a prediction context associated with a current use case; based on said associated prediction context, using the hardware processor to select an existing prediction model network architecture configured for a similar use case time series prediction task; replicating the selected existing prediction model network architecture to create a plurality of candidate prediction model network architectures; inputting, using the hardware processor, a time series data to each of the plurality of the candidate prediction model network architectures; training, in parallel, using the hardware processor, each respective candidate prediction model network architecture of the plurality with the input time series data; modifying, using the hardware processor, each of the plurality of the candidate prediction model network architectures by applying a respective different set of one or more model parameters while being trained in parallel; and determining, using the hardware processor, from the plurality, a fittest modified prediction model network architecture for solving the current use case time series prediction task.

According to one aspect, there is provided a computer-implemented system for automatically synthesizing optimized deep neural network architectures for time series prediction. The system comprises: a memory storage device for storing a computer-readable program, and at least one processor adapted to run the computer-readable program to configure the at least one processor to: receive a prediction context associated with a current use case; based on said associated prediction context, select an existing prediction model network architecture configured for a similar use case time series prediction task; replicate the selected existing prediction model network architecture to create a plurality of candidate prediction model network architectures; input a time series data to each of the plurality of the candidate prediction model network architectures; train, in parallel, each respective candidate prediction model network architecture of the plurality with the input time series data; modify each of the plurality of the candidate prediction model network architectures by applying a respective different set of one or more model parameters while being trained in parallel; and determine, from the plurality, a fittest modified prediction model network architecture for solving the current use case time series prediction task.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

The foregoing aspects and other features are explained in the following description, taken in connection with the accompanying drawings, wherein:

FIG. 6 depicts a table providing a mapping of types of DNN model architectures (e.g., CNN, RNN, MLP) and a subsets of possible mutations that can be applied to a particular DNN architecture type;

FIG. 7C depicts a user interface that, in response to the business use context entered via a user, presents the recommended model architecture pipelines for time series prediction;

DETAILED DESCRIPTION

According to an embodiment, the present disclosure provides for a system and a method for system providers to perform time series (TS) predictions and particular, an automated and general data processing framework, which achieves higher accuracy for complex time series prediction problems.

That is, given a (multivariate) time series X={$\underline{x}$(1), . . . , $\underline{x}$(n)}, where $\underline{x}$(t)={x(t), . . . , x(t)}, the system and method synthesizes and trains an optimized deep neural network (DNN) architecture that is configured to make time-series predictions.

Figure 1:
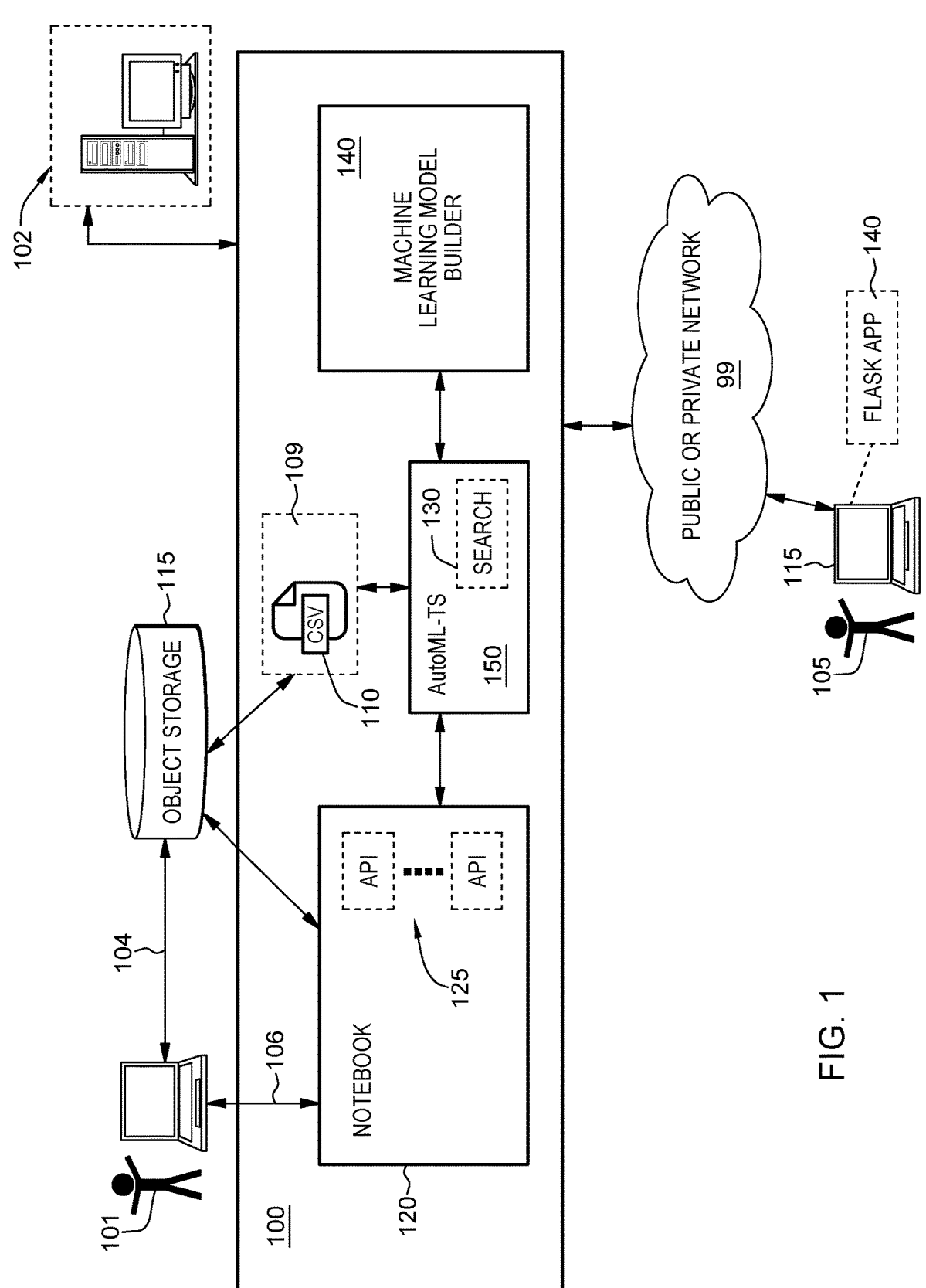
FIG. 1 schematically shows an exemplary data processing framework applicable to implement the embodiments for automatically building a time-series prediction model according to embodiments of the present invention.

FIG. 1 depicts a generic block diagram showing the automated data processing framework 100 for achieving higher accuracy for complex time series prediction problems. The automated and general framework is configured to achieve higher accuracy for complex time series prediction problems including those complex time series prediction problems, e.g., such prediction problems 1) where there of DL architectures for predicting time series, 2) where there is large variation in real-life time is limited knowledge series, e.g., dependence structure, noise level, amount of data, and 3) where there are additional parameters to tune, e.g., window length, window overlap (vs. images that have fixed size).

In an embodiment, the automated data processing framework 100 runs on one or more computing systems 102 to receive inputs including time-series data and build machine learned models to solve time-series prediction problems. In an embodiment, an end user, e.g., a data scientist 101, can upload time-series data 104 into an object data store 115. For example, via a user interface 110, the end user uploads time-series data, e.g., tables, and other data to a cloud object store. Alternately, the end user 101 can specify that the automated framework 100 receive time-series data from a web-based storage location specified by a uniform resource locator (URL). Other data input to the system can include, but is not limited to: Target(s) and predictor(s) for prediction, timestamp/dates; Tasks: forecasting (including forecasting horizon), anomaly detection, clustering; Task related parameters such as: look back window, window overlap; a required DNN algorithm(s), e.g., a CNN, RNN; and a domain of the time series data: e.g., financial services, supply chain, transportation; and existing DNN architectures used in any relevant previous use-cases.

In an embodiment, the end user 101 can further interact with a notebook 120 such as Watson Studio® (registered Trademark of International Business Machines Corporation) or any like a web-based application for interactive computing 106. For example, using the notebook software tool 120, the end user 101 can use Python libraries of application programming interfaces (APIs) 125 to assemble, test, and run all of the building blocks to work with data and save the data in object storage 115 for use in building and deploying time-series prediction models. In an embodiment, notebook 120 can include a Jupyter notebook application that allows interactive document creating and sharing, and runs methods for data cleaning/transforming/analyzing, statistical modeling, machine learning, etc. Other similar data analysis and visualization notebook tools 120 running Python, Julia, R programming languages can be used to receive and process the data, context and other inputs into the processing framework 100.

As shown in FIG. 1, processing framework 100 includes the AutoML-TS build process or plug-in module 150 that interfaces with program and Python libraries of the notebook implementation 120 for building time-series prediction models 140 according to embodiments of the present invention. In an embodiment, an automated machine learning for time series data (AutoML-TS) build process or plug-in module 150 consumes data input from the notebook 120 and/or from the object storage cloud in a comma-separated value (CSV) format 110. In an embodiment, a data model 109 is invoked to translate the raw time-series data stored in tables and other input formats in object storage into a comma-separated value (CSV) format for use by the AutoML-TS build process (plug-in) 150. The AutoML-TS plug-in module 150 includes a model search module 130 for automatically running methods to first search for relevant model architectures for the time-series data for the particular domain, business problem or context, extract the best model architecture, and according to the principles of the invention, invokes further machine learning modules 140 for building a concrete, consumable time series prediction model from the extracted best model architecture.

As further shown in FIG. 1, once the concrete, consumable time series prediction model is built it is deployable via the cloud data processing framework 100 as a web-based application, or downloadable to a particular user device 105. In an embodiment, a flask application 135 provides a user interface, e.g., a Web Server Gateway Interface, enabling a further end-user via his/her computing device 115 to forward requests over a public or private network 99 to use the deployed AutoML-TS and other framework modules written in Python.

Figure 2:
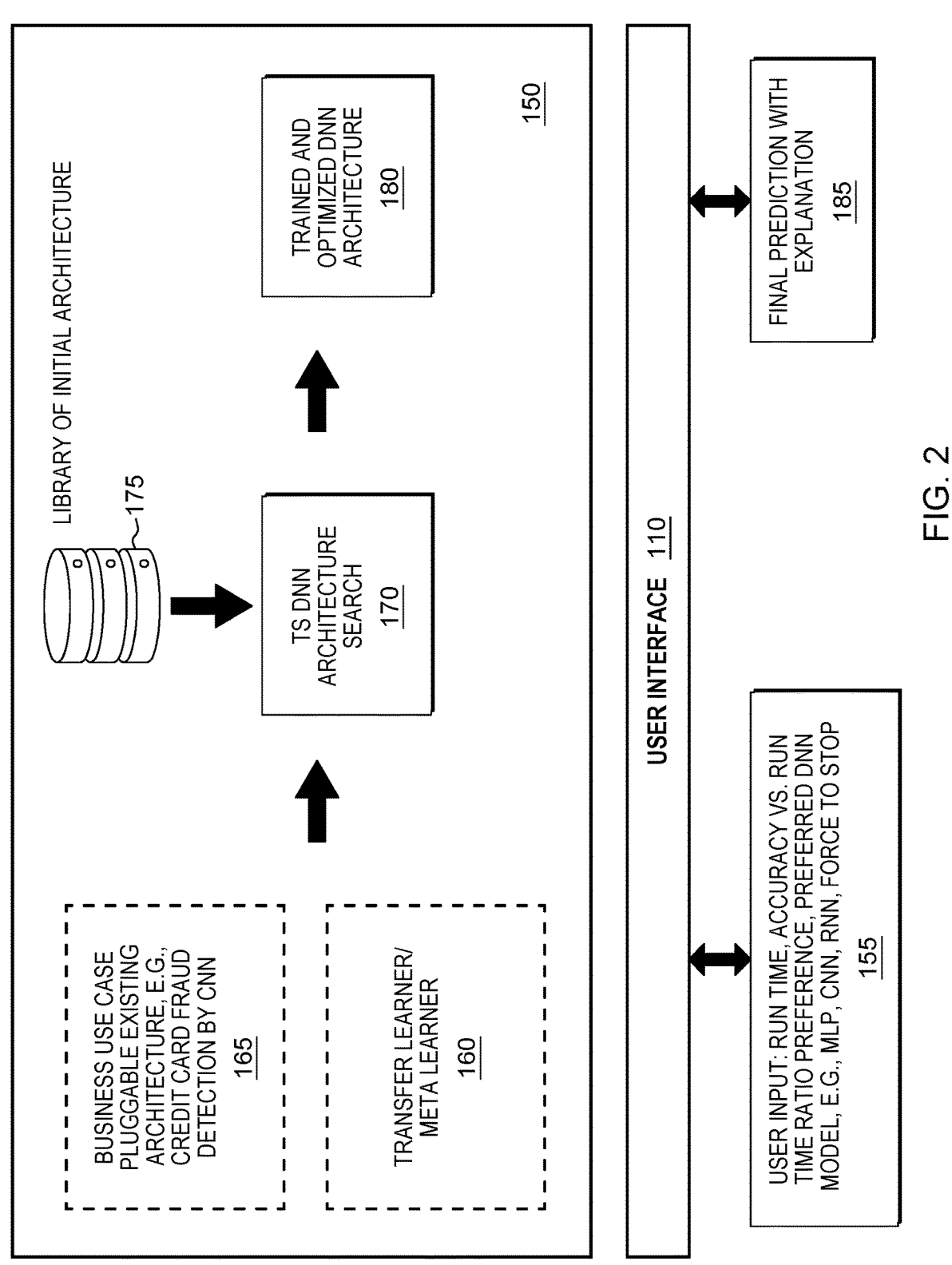
FIG. 2 conceptually illustrates a block diagram depicting the components of the AutoML-TS plug-in module.

A block diagram depicting the operational components of the AutoML-TS plug-in module 150 is shown in FIG. 2.

As shown in FIG. 2, the AutoML-TS plug-in module 150 of the automated data processing framework 100 builds models to solve time-series prediction problems.

In an embodiment, the AutoML-TS plug-in module 150 of the automated framework includes a storage library 175 of initial DNN architectures that include model build architectures that can be used as a starting point for building new DNN models according to time-series data and other user inputs. To accomplish this, the framework 100 further includes a time-series DNN architecture search module 170 running program code implementing logic for conducting searches to try to find a match to an existing use case model architecture. That is, an initial search is conducted to determine whether similar time-series data has been processed by the AutoML-TS plug-in module 150 and to which a time-series model prediction architecture for solving a time-series prediction problem has already been created. If time-series DNN architecture search module 170 finds existence of a use case on a similar problem or time-series data context (e.g., short term energy prediction or credit card fraud prediction), the search module 170 will select a corresponding architecture for that use case as the initial architecture for the library 175 of initial DNN architectures search.

In an embodiment, as shown in FIG. 2, the automated AutoML-TS plug-in module 150 in data processing framework 100 further includes a module 165 for storing business use case pluggable pipelines. The business use case pluggable pipe-line storage module 165 includes all of the DNN prediction pipeline architectures built in the past, i.e., historical use cases of the built DNNs for solving time-series prediction problems for past time-series forecasting contexts including, but not limited to: electricity demand short term forecasting, credit card fraud detection and traffic volume prediction, IoT Building anomaly detection, financial credit risk prediction, transportation parking availability prediction, etc. Essentially, business use case pluggable storage module 165 is an architecture, database for historical business use cases associated with prior contexts. If a user provides context of a particular tie-series data set, the system can use the pluggable pipe-line storage module 165 to find all of the past DNN prediction pipeline architectures built in the past that provides an optimal solution.

In an embodiment, the AutoML-TS plug-in 150 further includes a transfer learner/meta learner module 160 for architecture selection. For example, for newly input time-series data corresponding to a current input context, if the pluggable pipe-line storage module 165 first determines whether there is any identical or similar prior/historical use case context, i.e., whether a DNN pipeline architecture has already been built for that particular context. If no use case exists and no DNN architecture pipeline has been built for that type of time-series data, the meta learning/transfer learning module 160 for architecture selection runs program code implementing logic for computing a list of time-series data characteristic features, e.g., variation, skewness, kurtosis, trend, seasonality, and Hurst parameter (i.e., to describe a measure of the long term memory of a time series). Based on the characteristic features list characterizing the input time-series data, the meta learning/transfer learning module 160 can find a recommended initial DNN architecture(s). In an embodiment, the meta learner module 160 is a ML learning model which takes input features such as skewness, kurtosis, etc., for the purpose of identifying the similarity of the user input data and the data in the system and can output a starting neural network architecture.

In an embodiment, the meta learning module 160 can be enabled/disabled by the user. If the user thinks his/her entered dataset is a common one, which the system likely handled in the past, the user can enable the meta learning.

Figure 3A:
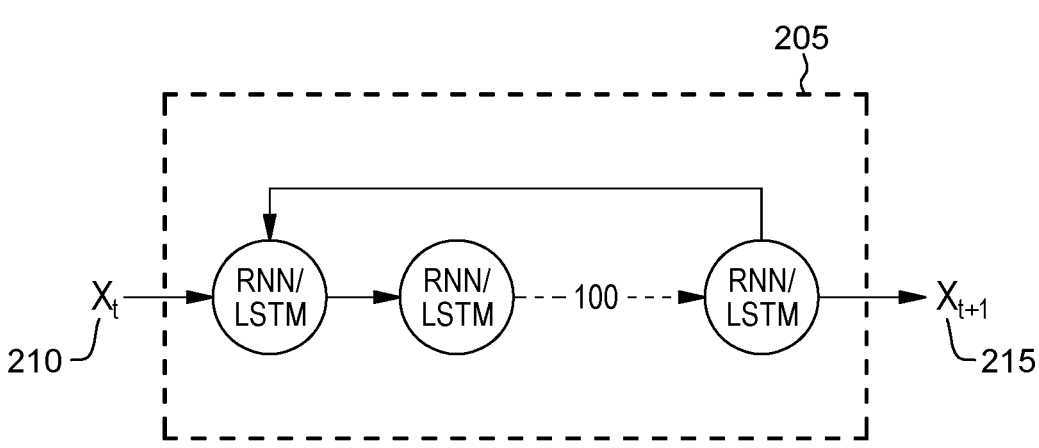
FIG. 3A illustrates an example pluggable business use case relating to a short term electricity demand forecasting model generated to predict future time series data.

FIG. 3A illustrates an example business use case pluggable and meta-learning embodiment. Particularly, the pluggable business use case module 165 provides an inventory of top picked architectures based on past use cases. One pluggable business use case 200 shown in FIG. 3A relates to short term electricity demand forecasting model 205 that was prior generated to receive multivariate time series data 210 ($X_t$) and used to predict future time series data 215 ($X_{t+1}$). The short term electricity demand forecasting model 205 is a DNN model architecture that includes an RNN and LSTM with 100 hidden layers. This architecture 200 is output from module 165 as a recommendation output when the user has the same input use case.

Figure 3B:
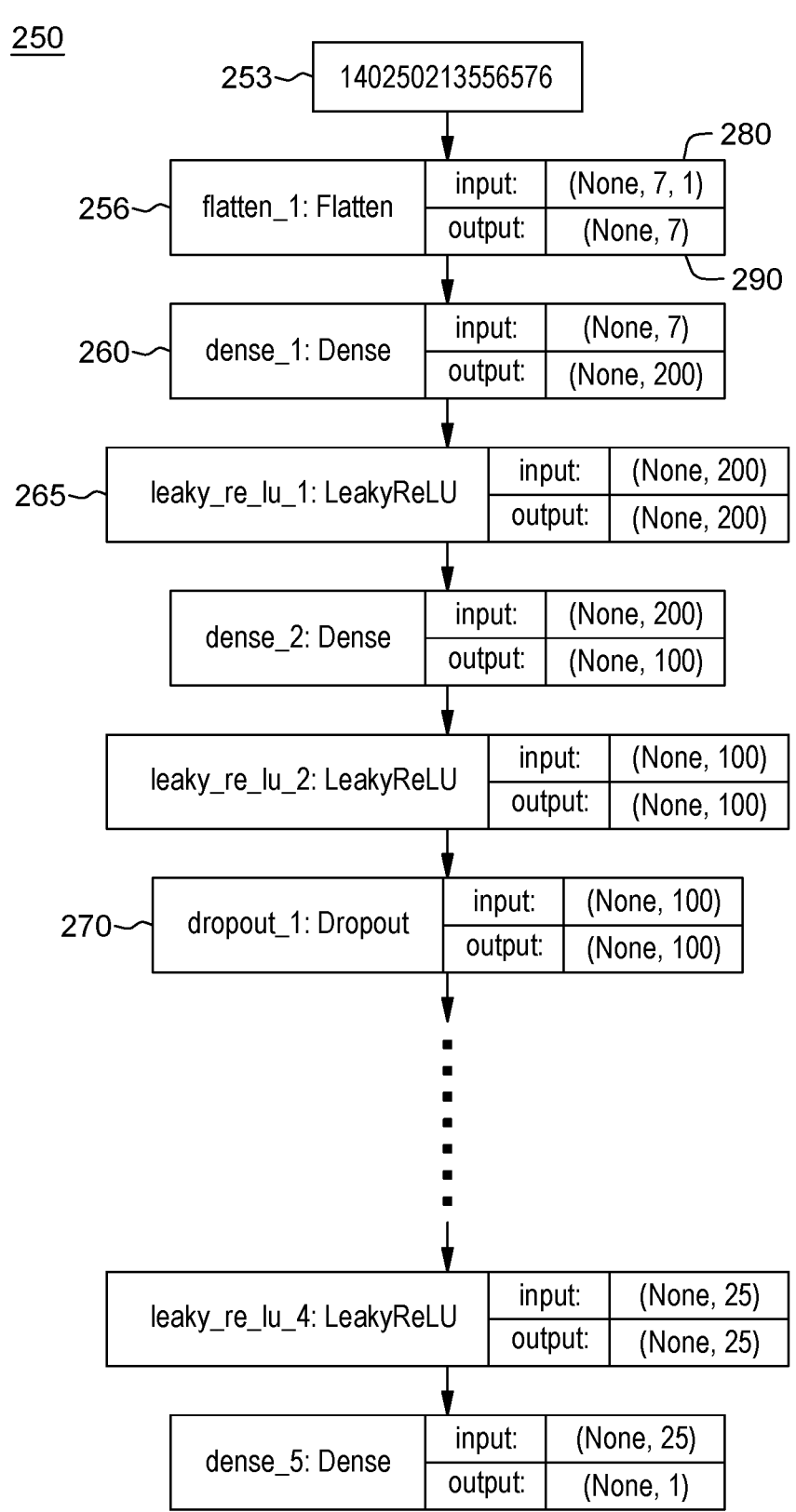
FIG. 3B shows a portion of an example multi-layer perceptron (MLP) feedforward architecture structure for use as an initial or pluggable business use case architecture according to an embodiment of the present invention.

As a further example selected architecture pipeline, FIG. 3B shows a schematic of a portion of an example multi-layer perceptron (MLP) feedforward architecture structure 250. In the example MLP feedforward neural network model architecture structure 250 depicted in FIG. 3B, there is shown a linear composition of multiple (sequential) layers, e.g., an input layer, hidden layers, and an output layer, wherein each layer receives input information, performs some computation(s), and finally outputs the transformed information. The output of one layer will flow into the next layer as its input. In the example DNN MLP architecture structure 250, a top layer 253 shows an identifier of the particular sequential MLP model, and successive layers show a first flatten layer 256 to flatten the input data to the NN model, one or more regular deeply connected neural network layer or dense layers 260, one or more leakyReLU activation function layers 265 each of which is a piecewise linear function modified to allow small negative values when the input is less than zero, and one or more dropout regularization layers 270 for reducing overfitting. Each of these layers include an indication 280 of the shape of the inputs to and an indication 290 of the outputs of that layer. These layers include layers that function to process an input univariate or multivariate time sequence data set. Other layer types that can be included in a CNN or RNN model architecture include, but are not limited to: cropping layers, concatenate layers, convolution layers and pooling/unpooling layers. To completely specify each of the layers in a selected architecture, there can be specified additional details including, but not limited to: a shape of the input data, a number of neurons/units in the layer, and any initializers, regularizers or constraints.

Such a structure/data set architecture 250 is associated for use in a past particular context, e.g., credit card fraud detection, and will be stored as a pluggable pipeline for a later time series prediction use given a new input data for a similar context. Thus, given a user input of a new data set for this context, the system will use as a starting point the initial architecture 250 shown in FIG. 3B to build a new model for the current new input data set.

In accordance with embodiments of the invention, adjustments can be made to the initial model architecture given the characteristic features of the new input data set (e.g., univariate vs. multivariate) and the selected or specified type of DNN architecture. For example, in the case of univariate time-series input data in which there is a single series of observations with a temporal ordering, there is formed a DNN modeling architecture to learn from the series of past observations to predict the next value in the sequence. In the case of multivariate time-series input data there is searched architectures for DNN modeling of multiple input series data that include two or more parallel input time series with each series having observations at the same time steps and an output time series that is dependent on the input time series; or architectures for modeling multiple parallel series inputs that include multiple parallel time series inputs and a value must be predicted for each.

According to embodiments of the invention, each of the stored DNN modeling architectures can be searched, i.e., mutated, to create other complex neural networks for optimizing a particular prediction problem or otherwise, tailoring a solution in terms of a particular run time or predicting in accordance with a desired accuracy. That is, based on a determination from the meta-learning module 160 that there was a similar context in the past, e.g., credit card fraud risk prediction, the time-series DNN architecture search module 170 will start a new search (i.e., apply mutations to) the selected architecture that was built in the past and that was associated with that prior context, i.e., credit card fraud risk prediction. The meta-learning module 160 will provide no initial architecture recommendation if the use case is not in the database. However, given the context and characteristics of the data, assumptions of an initial architecture can be obtained that is used as a starting point.

FIG. 6 depicts a table 600 providing a mapping of types of DNN model architectures (e.g., CNN, RNN, MLP) and possible mutations 650 that can be applied to a particular DNN architecture type. For example, as shown in FIG. 6, an initial MLP DNN architecture 602 can initially include a sequence of layers 612, e.g., Input, Flatten, Dense (linear), etc. while an initial CNN architecture 605 can include a sequence of layers 615, e.g., Input, convolution, MaxPooling, Flatten, Dense, etc.

Returning back to FIG. 2, the TS DNN architecture search module 170 runs methods that synthesize new TS DNN architectures from a selected architecture or initial DNN architecture. For example, search module 170 can run a program such as NCEvolve which is an evolutionary algorithm implementing a method for synthesizing top-performant networks, minimizing the amount of training time and resource needs. As described in a reference to M. Wistuba entitled *Deep Learning Architecture Search by Neuro-Cell-based Evolution with Function-Preserving Mutations* (ECML-PKDD 2018), the whole content and disclosure of which is incorporated by reference herein, NCEvolve synthesizes CNN architectures for image/text by mutating neuro-cells using function-preserving operations. Function-preserving operations is a family of network manipulations to transfer knowledge from one network to another. TS DNN architecture search module 170 utilizes NCEvolve and extends it for time series data with the addition of MLP structure. For example, starting from an initial DNN architecture, NCEvolve applies a set of predefined mutations, e.g., insert a CNN layer, alter kernel size and branching, until the learning curve does not improve anymore.

For example, as shown in FIG. 6, based on the characteristic features of the input data, or based on user selected parameters (e.g., run time, accuracy, etc.), a choice of pre-defined operations can be performed upon the initial DNN architecture. For example, for MLP architectures such operations or mutations 625 that can be applied to the architecture include, but are not limited to: alter window length, alter overlap size, insert dense layer, alter learning rate, alter number of units given layers, etc. For example, in the case of an initial MLP model architecture, a function-preserving mutation 652 to be applied can include widening the shape of the input data or inserting a dense layer. For CNN model architectures, a function-preserving mutation 654 that can be applied to the architecture can include: identity, altering a kernel size, inserting a convolution layer, alter learning rate, alter number of channels, branch and insert, branch and insert block, insert residual block, alter number of units given layers, branch convolution, alter window length, alter overlap size, insert dense layer, insert dense layer dropout, or insert a number of filters. For example, for extremely highly variance data, where temporal dependencies are not known, the "window length" parameter of the model can be extended or modified multiple times. For RNN architectures 606, a mutation 656 that can be applied to the architecture include can include: alter window length, alter overlap size, insert dense layer, alter learning rate, or alter number of units given layers.

Returning to FIG. 2, in an embodiment, the DNN search module 170 runs a NCevolve (neuro cell evolvement) algorithm to grow a new DNN model from the selected architecture. The algorithm starts from the initial architecture, then applies different mutations, e.g., inserting a layer, branching, etc. in a sequence. As the automated DNN search applies to time series data, due to the data being a sequence and having temporal dependency, the algorithm needs to keep the order and group them in the way to keep the temporal dependency.

More particularly, the NCEvolve approach starts from a very simple network template which contains a sequence of neuro-cells. These neuro-cells are architecture patterns and the optimal pattern will be automatically detected by AutoML-TS algorithm. This algorithm assumes that the cell initially contains only a single convolutional layer and then keeps changing it by function-preserving mutations. These mutations change the structure of the architecture without changing the network's predictions. This can be considered as a special initialization such that the network requires less computational effort for training.

Evolution of Neuro-Cells

The cell-based neuro-evolution is as follows: Given is a very simple neural network architecture which contains multiple neuro-cells, the cells itself share their structure and the task is to find a structure that improves the overall neural network architecture for a given data set and machine learning task. Initially, a cell can be identical to a convolutional layer and is changed during the evolutionary optimization process. The evolutionary algorithm is using tournament selection to select an individual from the population: randomly, a fraction k of individuals is selected from the population. From this set the individual with highest fitness is selected for mutation. In an embodiment, the fitness by the accuracy achieved by the individual on a hold-out data set. The mutation is selected at random which is applied to all neuro-cells such that they remain identical. The network is trained for some epochs on the training set and is then added to the population. Finally, the process starts all over again. After meeting some stopping criterion, the individual with highest fitness is returned.

Mutations

All mutations used are based on the function-preserving operations. This means, a mutation does not change the fitness of an individual, however, it will increase its complexity. The advantage over creating the same network structure with randomly initialized weights is a partially pretrained network is used as a start. This enables training the network in less epochs. All mutations are applied only to the structure within a neurocell. The neuro-evolutional algorithm considers the following mutations:

Insert Convolution: A convolution is added at a random position. Its kernel size can be for example, 3×3, the number of filters is equal to its input dimension. It is randomly decided whether it is a separable convolution instead.

Branch and Insert Convolution: A convolution is selected at random and branched. A new convolution is added according to the "Insert Convolution" mutation in one of the branches.

Insert Skip: A convolution is selected at random. Its output is added to the output of a newly added convolution (see "Insert Convolution") and is the input for the following layers:

Alter Number of Filters: A convolution is selected at random and widened by a factor uniformly at random sampled, e.g., from [1.2, 2]. This mutation might also be applied to convolutions outside of a neuro-cell.

Alter Number of Units: Similar to the previous one but alters the number of units of fully connected layers. This mutation is only applied outside the neuro-cells.

Alter Kernel Size: Selects a convolution at random and increases its kernel size by two along each axis.

Branch Convolution: Selects a convolution at random and branches it. The motivation of selecting this set of mutations is to enable the neuroevolutionary algorithm to discover similar architectures as proposed by human experts. Adding convolutions and allowing combinations of adding skips and convolutions allow to discover residual networks. Finally the combination of branching, change of kernel sizes and addition of (separable) convolutions allows to discover architectures similar to Inception, Xception or FractalNet. The optimization is started with only a single individual. The population is enriched by starting with an initialization step which creates 15 mutated versions of the first individual. Then, individuals are selected based on the previously described tournament selection process.

Figure 4:
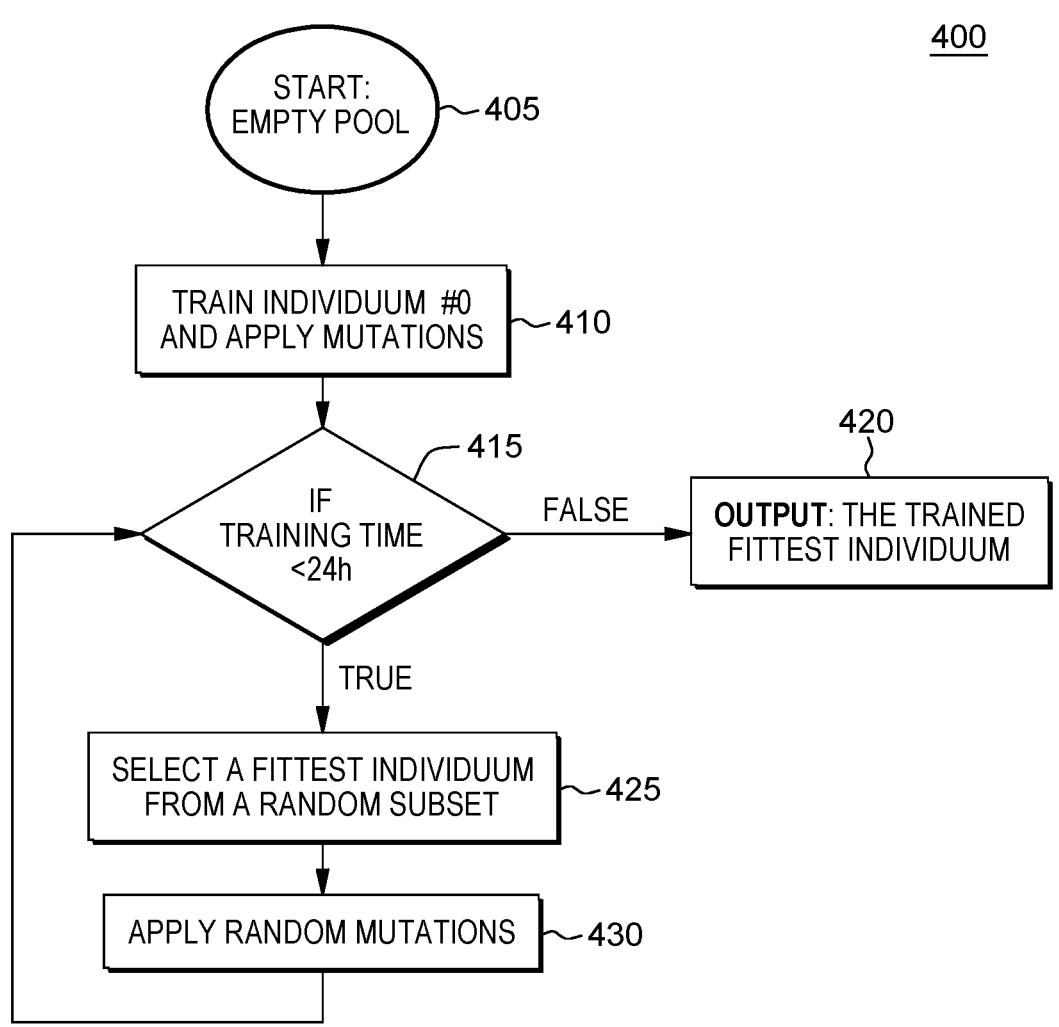
FIG. 4 depicts a method run by the architecture search module to grow a new DNN model from the selected architecture according to an embodiment of the invention.

FIG. 4 depicts a method 400 run by the architecture search module 170 to grow a new DNN model from the selected architecture using the NCEvolve algorithm.

Initially, at 405 there is defined an empty "pool" in which operations are dragged and applied to the selected original or initial DNN model architecture. Then, at 410, an "individuum" or "blocking structure" model architecture is trained and mutations are applied to "grow" a new model. In an embodiment, multiple individuums or model architectures are trained in parallel and different mutations applied to blocks of each individuum each to facilitate speed of obtaining a fittest TS prediction model. At step 410, growing a new model from the original DNN model architecture can include, but is not limited to, applying a set of mutations to a block such as: inserting a more flat data layer, inserting a dense layer, changing (e.g., widening) a window length, changing an overlap length, changing model hyperparameters, branching and inserting, altering a kernel size, inserting a convolution layer, increasing a learning rate, etc.

Then, continuing to 415, a determination is made as to whether a pre-determined training time has elapsed for the indivduum training. As an example, a 24 hour training period may be set for training the models, however, this training period is configurable by the user. If the training period has not ended, then at 425 a "fittest" individuum from a random subset of individuums is selected, and at 430 further random mutations are applied to that selected fittest individuum for fine tuning them. A fittest individuum is a model that has the lowest computed error when the model is run with a test data set and the prediction error within a specified accuracy is determined. The method returns to step 415 to again determine whether a pre-determined training time has elapsed. If not, the process steps 425 through 430 repeat. Once it is determined that the pre-determined training time has elapsed, then at 420, the method outputs the trained fittest individuum.

Figure 5:
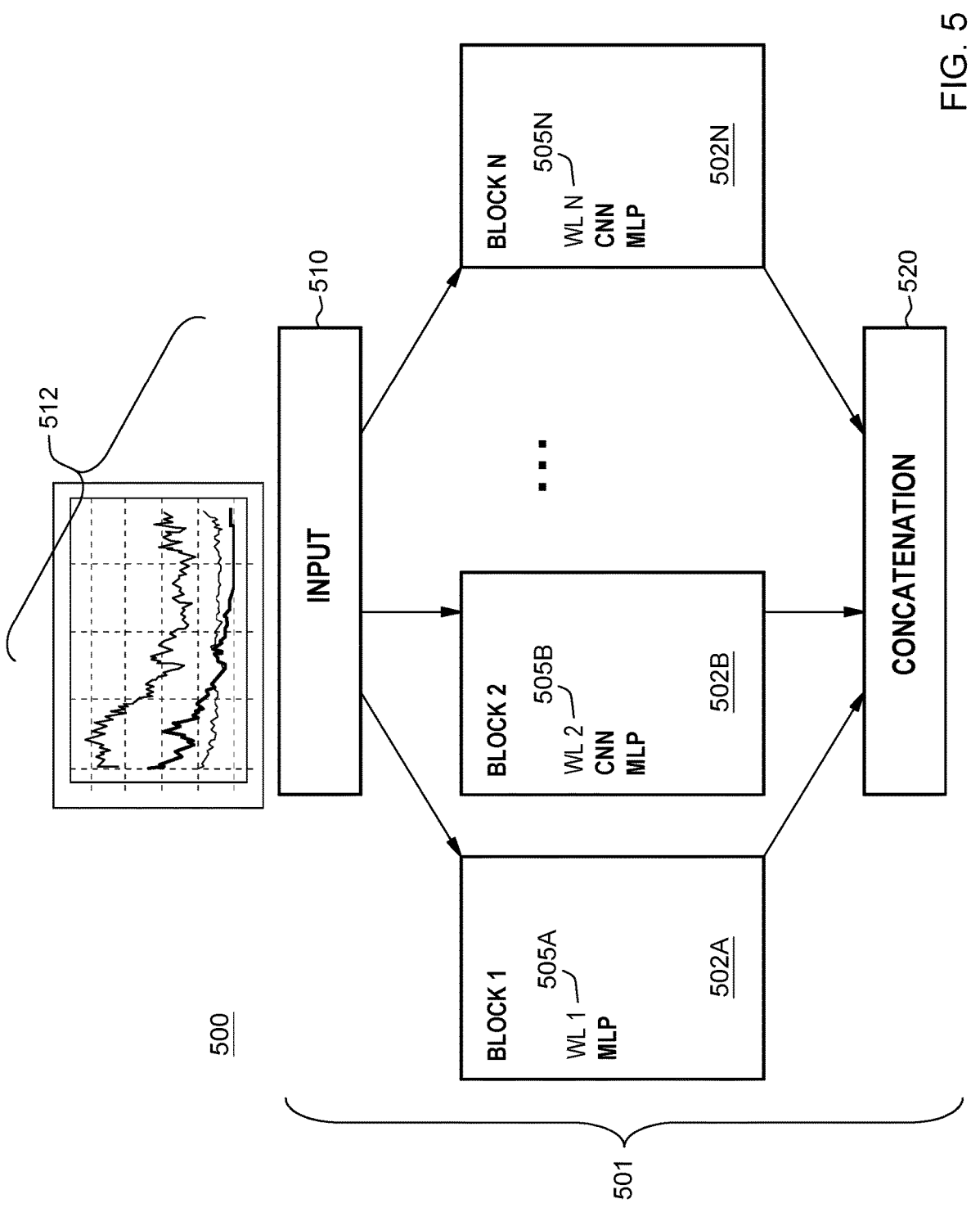
FIG. 5 depicts the growing of a DNN time-series prediction model using the NCevolve search algorithm of FIG. 4.

FIG. 5 depicts the growing of a DNN time-series prediction model 500 using the NCevolve search algorithm 400 of FIG. 4. In particular, the NCEvolve search algorithm implements an individuum 501 of blocking structures 502A, 502B, . . . , 502N to be evaluated with the training data set. In embodiments, the DNN search algorithm is fully automatic and time-series specific. It is tailored for time series prediction using a wide range of DNN architectures, e.g., including CNN, RNN, and MLP, and a concatenation of "blocking" structures containing, for example, CNN and MLP. The blocking structures 502A, 502B, . . . , 502N each mimics the ensemble methods in ML, removing the previous (false) assumption that only recurrent network models should be applied to time series data. The method starts with multiple "blocks" 502A, 502B, . . . , 502N, with each block of an individuum 501 including a NN itself. Instead of fitting one NN on the input time-series data set 510 that can include multi-variate time data 512, there is simultaneously performed a fitting of multiple parallel NNs in parallel blocks to the input data 510. Each blocking structure 502A, 502B, . . . , 502N resembles ensemble models, e.g., including a MLP, CNN, RNN, or a combinations thereof, which makes the architecture more robust and parallel search possible. For example, as shown, block 502A of individuum 501 includes a sole MLP, and block 502B includes a connection of both an MLP and CNN. As indicated at step 410, FIG. 4, different mutations can be applied to each block 502A, 502B, . . . , 502N of the individuum in parallel with one or more individuums 501 being processed in parallel. For example, as shown in FIG. 5, a first block structure 502A can be modified with a first Window Length (WL_1) parameter 505A, while block 502B can be modified with a second WL_2 parameter 505B and $N^{th}$ block 502N can be modified with a further WL_N parameter 505N. In the case of a block implementing a CNN, there may be inserted a convolution layer, a branch and insert operation, or the kernel size can be altered. Returning to FIG. 6, in particular, for each parallel trained block 502A, . . . , 502N, a subset 652, 654, 656 of mutations from a superset of mutations 625 can be applied in a sequence.

In an embodiment, the types of mutations chosen for application to a particular block is data driven. Based on characteristics of the data and the type of DNN network structure of the blocking structure, certain mutations are applied. For example, computed characteristics of the input time-series data is initial obtained and/or provided, e.g., such as: variation, skewness, kurtosis, trend, seasonality, and Hurst parameter value (i.e., to describe a measure of temporal dependency). These data characteristics are then used to determine the components of the mutations sequence applied. For example, based on the Hurst parameter value will determine the Window Length mutation parameter.

Returning to FIG. 5, each block 502A, 502B, . . . , 502N can generate an output which can be concatenated at concatenation layer 520. The concatenation layer 520 generates a single prediction value for the input data set. The output can be an averaged value of the outputs of each individual block 502A, 502B, . . . , 502N. For example, a final output layer of the blocking structure such as the MLP feedforward structure shown in FIG. 3A or 3B provides an output prediction that is concatenated at concatenation block 520.

The trained individuum 501 that is fittest or has lowest prediction error is output as an optimized new DNN model for the new input data set/context.

Returning to FIG. 2, the output of the architecture search module 170 is a new architecture is the fittest block, e.g., for solving a credit card risk fraud risk detection model. That is, the AutoML-TS plug-in module 150 of data processing framework 100 outputs the newly created trained and optimized DNN architecture 180 for time-series prediction irregardless of whether or not an initial architecture recommendation was provided. Besides outputting a trained and optimized DNN architecture, there is further generated for presentation or display via a device user interface output any forecasts/list of anomalies/clusters (depending on the tasks), with uncertainty scores, and any explanations (e.g., for extreme events).

As further shown in FIG. 2, the AutoML-TS plug-in module 150 of data processing framework 100 further provides user interface(s) 110 that enable entry user interactions with the architecture. Via a user interface, the end user interacts with the architecture to initiate a search start and additionally define a desired run time. A user can pause the search at anytime to get intermediate results.

Figure 7A:
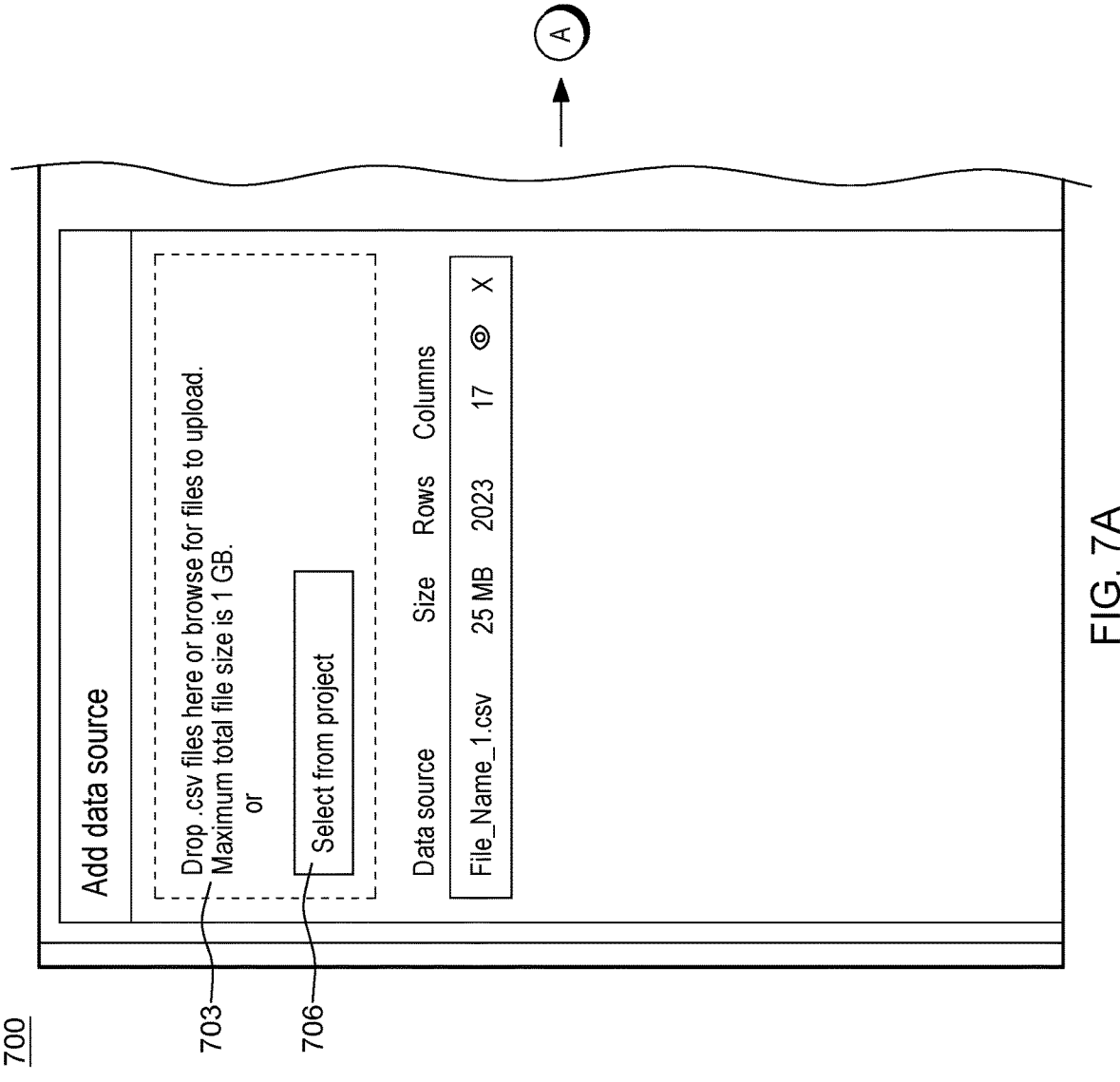
FIGS. 7A-7B show a user interface presented on a user device enabling entry of data for automated building of a time-series prediction model.

FIG. 7A shows a user interface presented on a user device enabling entry of data for automated building of a time-series prediction model. For example, prior to the use of the method 400 of FIG. 4, via interface screen 700, at 703 a user can add a data source such as by dragging/dropping .CVS files into a receptacle at the interface, or alternatively browse for files up to a given size to upload. Otherwise, at 706, the user can specify or load data and model of a specific project.

Figure 7B:
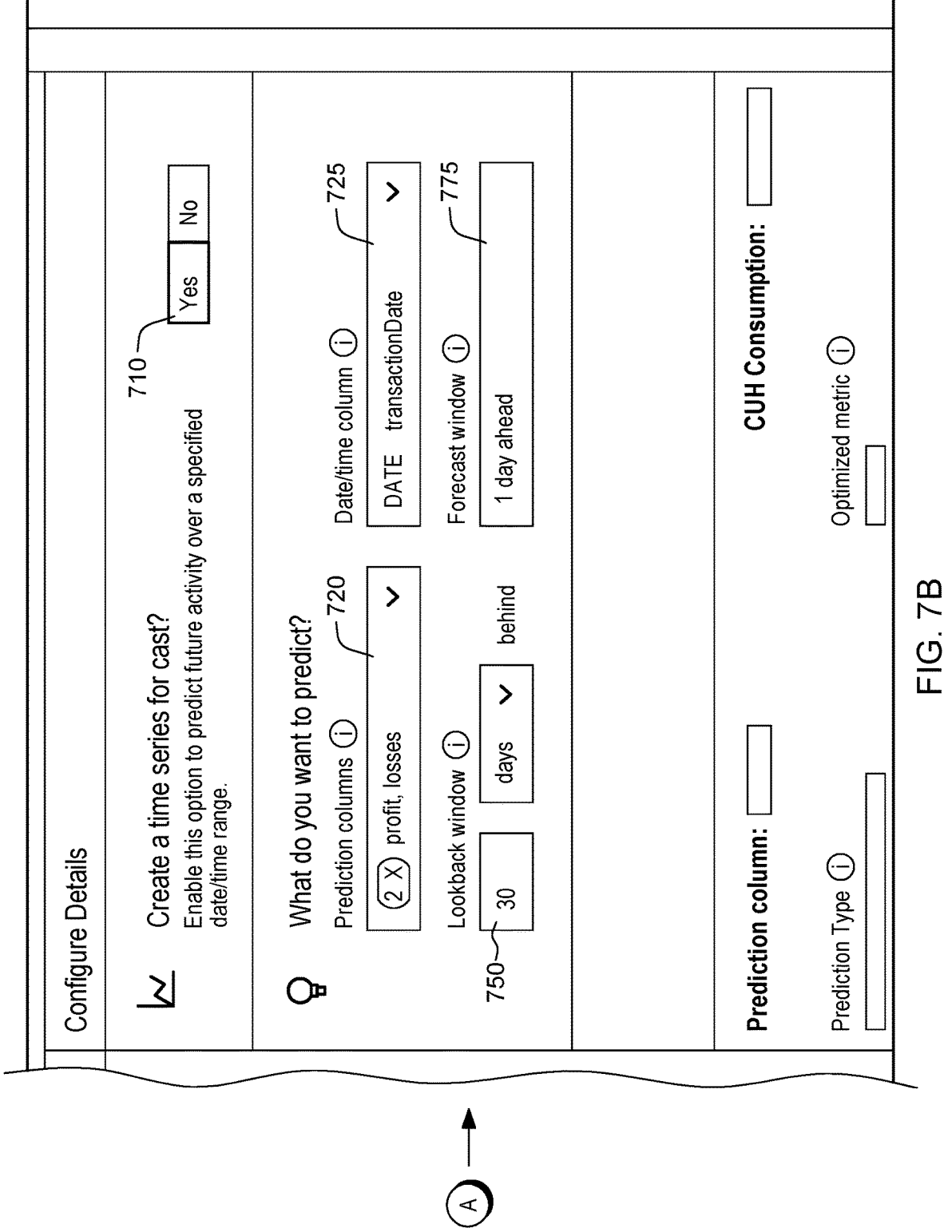

FIG. 7B further shows in the interface screen 700 a Yes/No selector 710 providing an ability to create a time series forecast for predicting a future activity over a specified date/time range. A further drop down menu selector 720 is provided to enable user entry of a business use context. That is, by selection of a prediction column, i.e., a model architecture (pluggable pipeline) will be found that is able to predict the values (e.g., profits and losses) in one column (of a data table) based on the rest of the columns' values.

FIG. 7C depicts a user interface 701 that, in response to the business use context entered via drop down menu selector 720, presents the recommended pipelines. In FIG. 7C, the user interface shows recommended pipelines that includes regular machine learning pipelines 730, e.g., autoregressor, XGBoost, Holt-Winters, or one or more existing deep neural network architectures, e.g., the profit_loss AutoML TS 740.

FIG. 7B shows a further menu selector 725 provided to enable user selection of a date/time column, e.g., a transactionDate, via the user interface presented on a user device. In response to the selection of the date/time column via menu selector 725, via interface screen 700, the user can enter via selectors 750 a lookback time window to specify how far back in time the time-series data of transactions is to be traced. A further drop down menu selector 775 is provided to enable user selection of a prediction forecast time window, e.g., 1 day ahead.

Returning to FIG. 2, via a further user interface 155, the user can enter a desired run time for solving a time series prediction problem, and a desired time series prediction result (prediction) accuracy. Alternately, the user can specify a run time ratio preference which is a ratio of additional gain accuracy gain over run time, e.g., a 1% higher accuracy per hour, which means one additional hour run time will lead to 1% higher accuracy conditional on the current accuracy. The system uses the run time accuracy to determine if it should further run or exit. In addition, the user can input to the system constraints. Some user input constraints can include requirements, e.g., feature(s) or a preferred DNN model, e.g., MLP, CNN, RNN, if the current architecture is different. Further user input constraints can include a maximum training time or model running time or a chosen targeted accuracy score. The architecture search will stop once the user target is reached. Alternately, the user can enter a command to force a stop of the processing, e.g., to obtain intermediate results.

Via further interface 185, the user can receive time-series prediction problem results, e.g., intermediate results or final results with an explanation. For example, after the DNN search is complete, the user can request a final output with an explanation. The final output will be an optimal neural network architecture, and the insights on the features. E.g., which are the top two dominate features in this architecture. For example, if the user wants to forecast energy consumption, the system 100 outputs a CNN with MLP blocks, the explanation could be "Convolution layers accounts for X % of this architecture and temperature and cloud coverage accounts for Y % of the data variation". Note that "temperature" and "cloud coverage" are features from the input data. Explanation is a by-product from the training and optimization DNN module. In an embodiment, it is implemented by an extension of the Local Interpretable Model-agnostic Explanations (LIME) library available at https:/github.com/marcotcr/lime. Such explanations may further include: a list of explanation in terms of causes for the results, and if the output is an outlier based on uncertainty score, a possible explanation.

An example shows experimental results of Deep AutoML TS versus state of art in terms of prediction power.

Example 1: DNN AutoML TS represents the output architecture which is compared against the state of art methods—auto-regressive moving average (ARMA) and Holt-Winters prediction model—for two datasets in the experiment. In particular, this example illustrates a univariate time-series data prediction. Root mean square error (RMSE) results based on 1) an ARMA(1,1) approach used model with known order (e.g., ARMA(1,1)+T(5)) is a value 1.34 while using the AutoML-TS with CNN results in RMSE of 1.11. Based on a Trend+Seasonality+ARMA(1, 1)+N(0,1), Holt-Winters error is a value 1.58 while using the AutoML-TS with CNN results in RMSE of 1.29. As the results shown, AutoML TS has lower prediction error.

Figure 8:
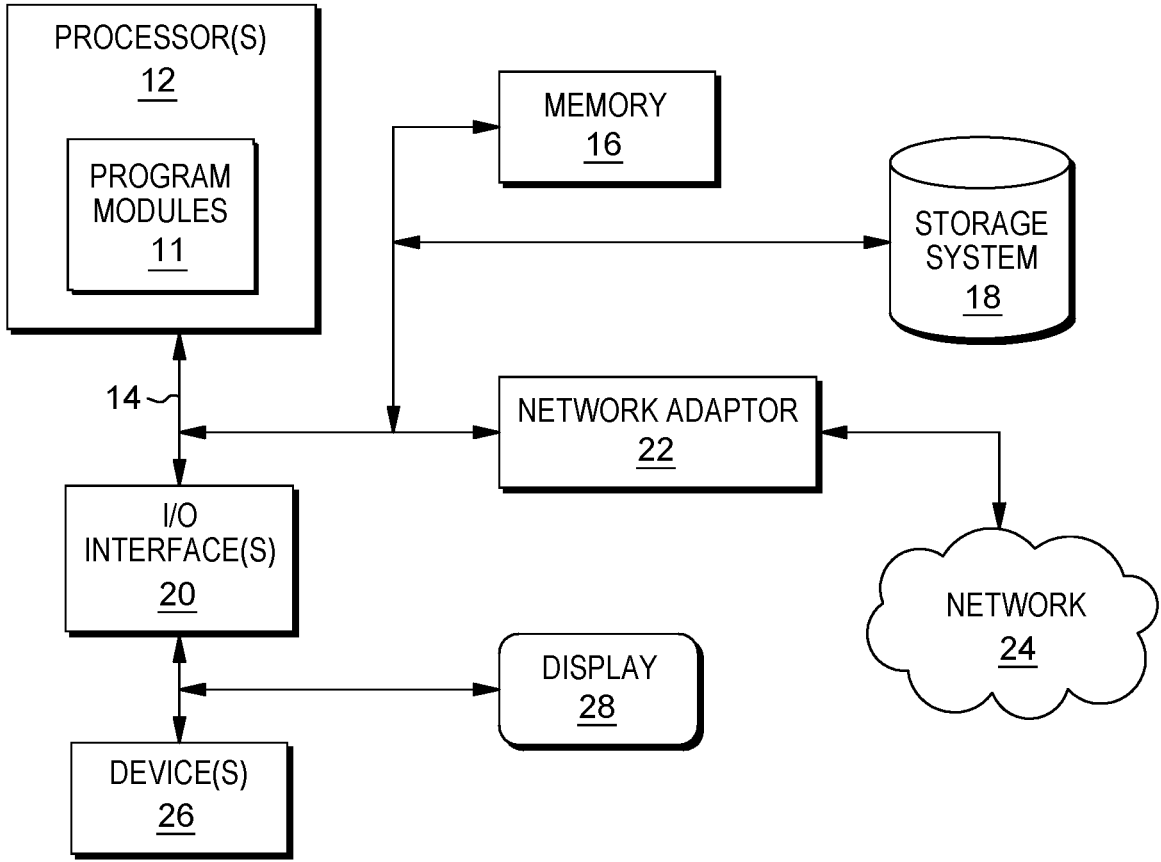
FIG. 8 illustrates a schematic of an example computer or processing system that may implement methods for automatically synthesizing and training optimized deep neural network architectures for time series prediction according to embodiments of the present invention.

FIG. 8 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 2, 4).

The components of the computer system may include, but are not limited to, one or more processors or processing units 12, a memory 16, and a bus 14 that operably couples various system components, including memory 16 to processor 12. In some embodiments, the processor 12 may execute one or more modules 11 that are loaded from memory 16, where the program module(s) embody software (program instructions) that cause the processor to perform one or more method embodiments of the present invention. In some embodiments, module 11 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
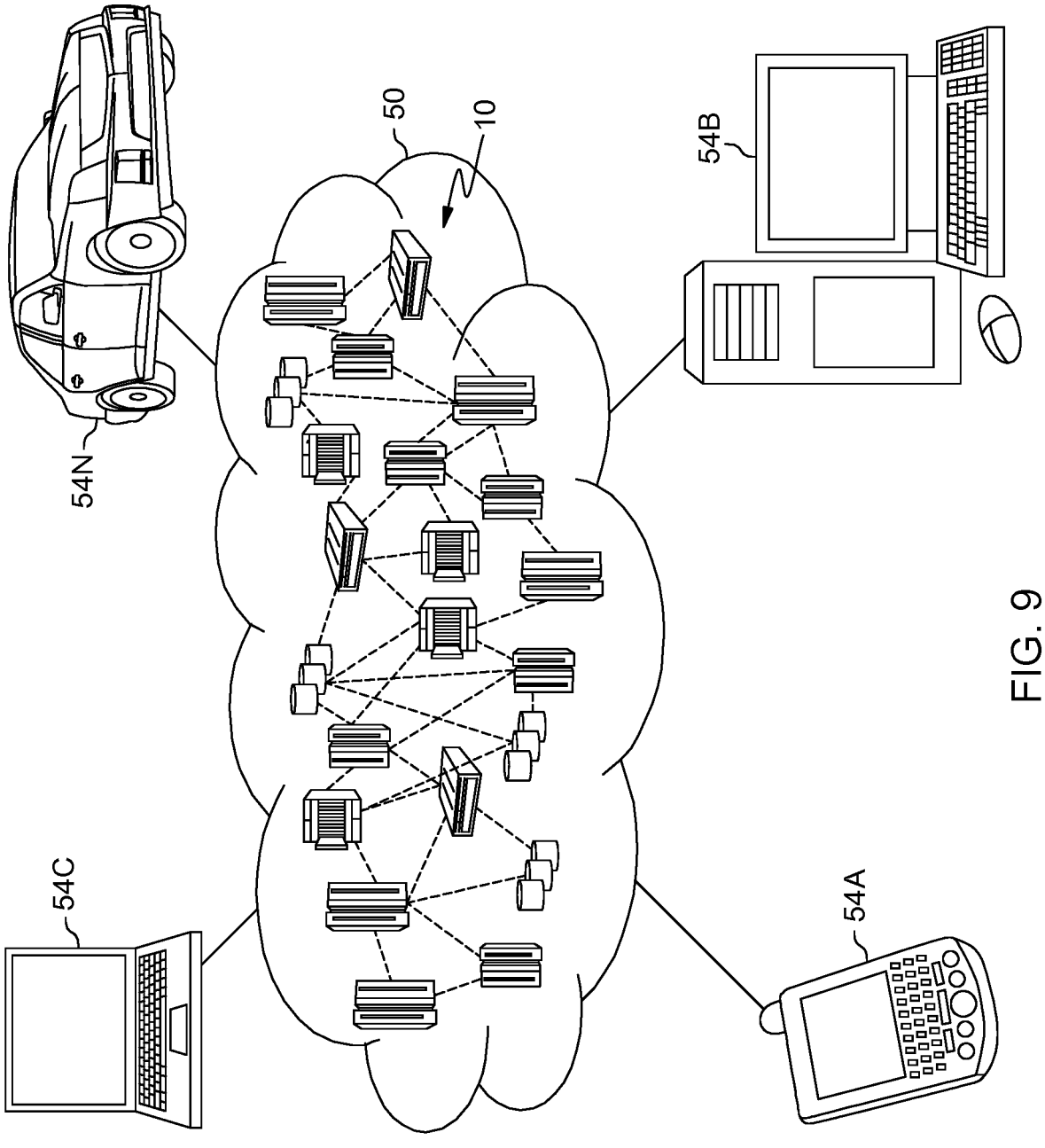
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
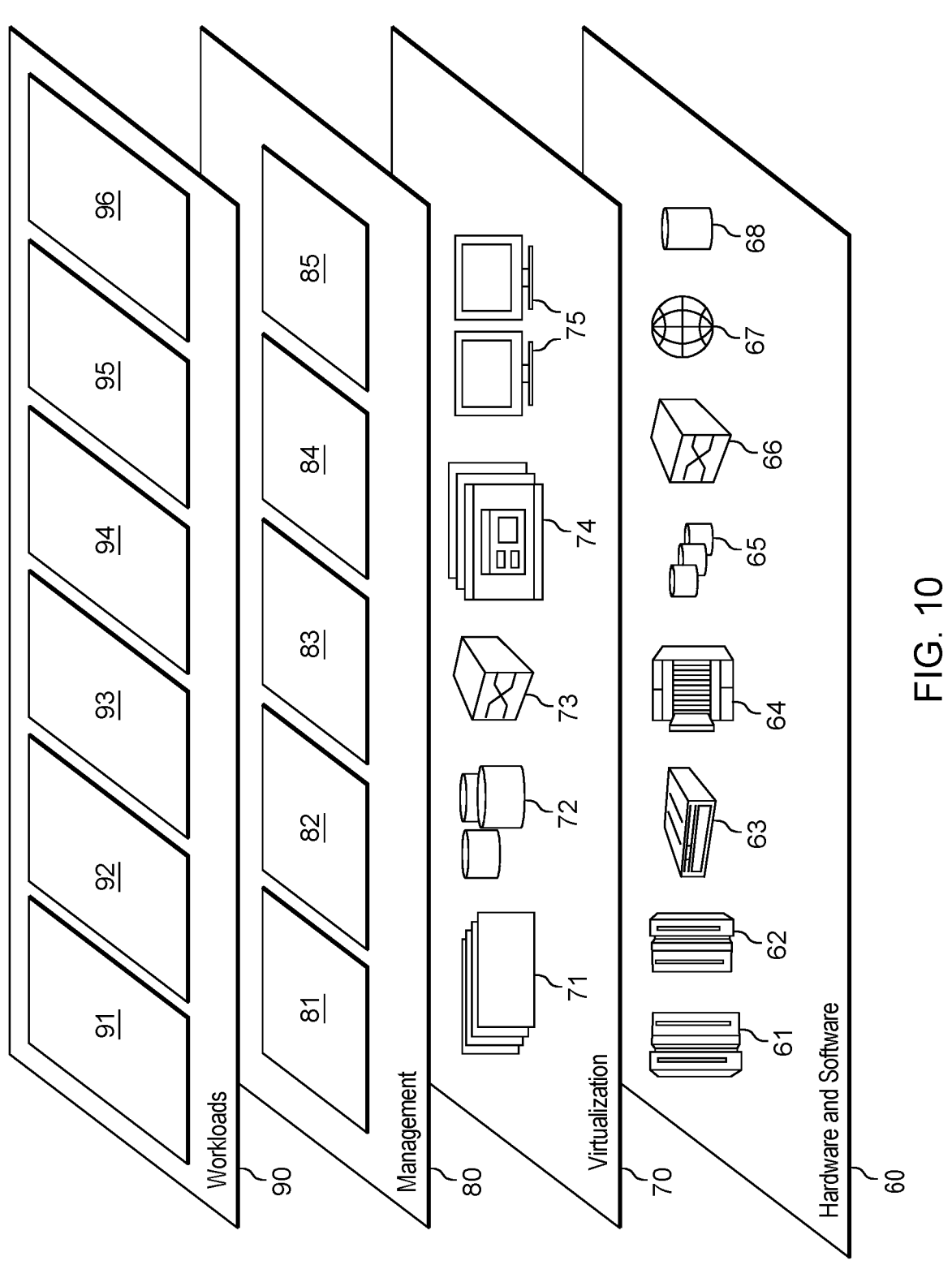
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing to automatically synthesize and train optimized deep neural network architecture including convolution neural networks, recurrent neural networks and multi-level perceptrons for time series prediction 96.

What is claimed is:

1. A computer-implemented method for automatically synthesizing optimized deep neural network architectures for time series prediction, the method comprising:

receiving, at a hardware processor, a prediction context associated with a current use case time series prediction task;

obtaining, using the hardware processor, characteristic features of a multivariate time series data to be used as input for the current use case time series prediction task, said multivariate time series data comprising two or more parallel input time series with each series having observations at same time steps and an output time series that is dependent on an input time series;

identifying, using the hardware processor, a similarity of the multivariate characteristic features of the multivariate input time series data and the data features of data used as input to an existing prediction model network architecture; and based on said associated prediction context and said identified similarity, using the hardware processor to select an existing prediction model network architecture configured for a similar use case time series prediction task;

replicating said selected existing prediction model network architecture to create a plurality of candidate prediction model network architectures;

inputting, using the hardware processor, the multivariate time series data to each of the plurality of said candidate prediction model network architectures;

receiving, at the hardware processor, via a user interface, one or more run time constraints for performing the use case time series prediction task, said one or more run-time constraints comprising a run time ratio indicating a ratio of an additional gain accuracy gain over a determined run time to determine if a candidate prediction model network architecture should further run or exit;

training, in parallel, using the hardware processor, each respective candidate prediction model network architecture of said plurality of candidate prediction model network architectures with said input time series data;

modifying, using the hardware processor, each of the plurality of said candidate prediction model network architectures by applying a respective different set of one or more model parameters while being trained in parallel; and determining, using the hardware processor, from said plurality, a fittest modified prediction model network architecture for solving the current use case time series prediction task that meet said one or more run-time constraints; and using said fittest modified prediction model network architecture for the time-series prediction task, wherein each of the plurality of candidate prediction model network architectures being trained comprises an individuum block structure, an individuum block structure comprising at least a multilayer perceptron and one or more of: a convolution neural network or a recurrent neural network; and said method further comprising:

generating, using the hardware processor, multiple individuum block structures, wherein said modifying each of the plurality of said candidate prediction model network architectures while being trained in parallel is performed for each individuum block structure.

2. The computer-implemented method according to claim 1, wherein the selecting of a prediction model network architecture for the current use case comprises: searching a library of existing prediction model network architectures previously generated for a historical use case related to the current prediction context.

3. The computer-implemented method according to claim 1, wherein a set of said one or more model parameters applied at a respective candidate prediction model network architecture comprises: a different look back time window length parameter, a different window overlap parameter.

4. The computer-implemented method according to claim 1, further comprising:

receiving, at the hardware processor, via the user interface, user constraints for performing said current use case time series prediction task, said one or more user constraints comprising at least one or more of: a specific prediction model network architecture, or a prediction accuracy.

5. The computer-implemented method according to claim 4, further comprising:

outputting, via said user interface, the fittest prediction model network architecture, and presenting, via said user interface, an explanation of one or more most significant characteristics of the fittest prediction model network architecture.

6. The computer-implemented method according to claim 1, further comprising:

selecting, using the hardware processor, a random set of individuums;

determining, using the hardware processor, a fittest individuum from said random set; and applying, using the hardware processor, random mutations to one or more candidate prediction model network architectures of the determined fittest individuum.

7. A computer-implemented system for automatically synthesizing optimized deep neural network architectures for time series prediction, the system comprising:

a memory storage device for storing a computer-readable program, and at least one processor adapted to run said computer-readable program to configure the at least one processor to:

receive a prediction context associated with a current use case time series prediction task;

obtain characteristic features of a multivariate time series data to be used as input for the current use case time series prediction task, said multivariate time series data comprising two or more parallel input time series with each series having observations at same time steps and an output time series that is dependent on an input time series;

identify a similarity of the multivariate characteristic features of the multivariate input time series data and the data features of data used as input to an existing prediction model network architecture; and based on said associated prediction context and said identified similarity, select an existing prediction model network architecture configured for a similar use case time series prediction task;

replicate said selected existing prediction model network architecture to create a plurality of candidate prediction model network architectures;

input a multivariate time series data to each of the plurality of said candidate prediction model network architectures, said multivariate time series data comprising two or more parallel input time series with each series having observations at same time steps and an output time series that is dependent on an input time series;

receive via a user interface one or more run time constraints for performing the use case time series prediction task, said one or more run-time constraints comprising a run time ratio indicating a ratio of an additional gain accuracy gain over a determined run time to determine if a candidate prediction model network architecture should further run or exit;

train, in parallel, each respective candidate prediction model network architecture of said plurality of candidate prediction model network architectures with said input time series data;

modify each of the plurality of said candidate prediction model network architectures by applying a respective different set of one or more model parameters while being trained in parallel;

determine, from said plurality, a fittest modified prediction model network architecture for solving the current use case time series prediction task that meet said one or more run-time constraints; and using said fittest modified prediction model network architecture for the time-series prediction task, wherein each of the plurality of candidate prediction model network architectures being trained comprises an individuum block structure, an individuum block structure comprising at least a multilayer perceptron and one or more of: a convolution neural network or a recurrent neural network, said at least one processor further configured to:

generate multiple individuum block structures, wherein said modifying each of the plurality of said candidate prediction model network architectures while being trained in parallel is performed for each individuum block structure; and concatenate at least one block structure for the input data set to generate a single deep neural network architecture having at least a convolution neural network and multilayer perceptron for solving the current use case time series prediction task.

8. The computer-implemented system according to claim 7, wherein to select a prediction model network architecture for the current use case, the at least one processor is further configured to:

search a library of existing prediction model network architectures previously generated for a historical use case related to the current prediction context.

9. The computer-implemented system according to claim 7, wherein a set of said one or more model parameters applied at a respective candidate prediction model network architecture comprises: a different look back time window length parameter, a different window overlap parameter.

10. The computer-implemented system according to claim 7, wherein the at least one processor is further configured to:

receive, via the user interface, user constraints for performing said current use case time series prediction task, said one or more user constraints comprising at least one or more of: a specific prediction model network architecture, or a prediction accuracy.

11. The computer-implemented system according to claim 10, wherein the at least one processor is further configured to:

output, via said user interface, the fittest prediction model network architecture, and present, via said user interface, an explanation of one or more most significant characteristics of the fittest prediction model network architecture.

12. The computer-implemented system according to claim 7, wherein the at least one processor is further configured to:

select a random set of individuums;

determine a fittest individuum from said random set; and apply random mutations to one or more candidate prediction model network architectures of the determined fittest individuum.

13. A computer program product, the computer program product comprising a computer-readable storage medium having a computer-readable program stored therein, wherein the computer-readable program, when executed on a computer including at least one processor, causes the at least one processor to:

receive a prediction context associated with a current use case time series prediction task;

obtain characteristic features of a multivariate time series data to be used as input for the current use case time series prediction task, said multivariate time series data comprising two or more parallel input time series with each series having observations at same time steps and an output time series that is dependent on an input time series;

identify a similarity of the multivariate characteristic features of the multivariate input time series data and the data features of data used as input to an existing prediction model network architecture; and based on said associated prediction context and said identified similarity, select an existing prediction model network architecture configured for a similar use case time series prediction task;

replicate said selected existing prediction model network architecture to create a plurality of candidate prediction model network architectures;

input a multivariate time series data to each of the plurality of said candidate prediction model network architectures, said multivariate time series data comprising two or more parallel input time series with each series having observations at same time steps and an output time series that is dependent on an input time series;

receive via a user interface one or more run time constraints for performing the use case time series prediction task, said one or more run-time constraints comprising a run time ratio indicating a ratio of an additional gain accuracy gain over a determined run time to determine if a candidate prediction model network architecture should further run or exit;

train, in parallel, each respective candidate prediction model network architecture of said plurality of candidate prediction model network architectures with said input time series data;

modify each of the plurality of said candidate prediction model network architectures by applying a respective different set of one or more model parameters while being trained in parallel;

determine, from said plurality, a fittest modified prediction model network architecture for solving the current use case time series prediction task that meet said one or more run-time constraints; and using said fittest modified prediction model network architecture for the time-series prediction task, wherein each of the plurality of candidate prediction model network architectures being trained comprises an individuum block structure, an individuum block structure comprising at least a multilayer perceptron and one or more of: a convolution neural network or a recurrent neural network, said computer-readable program further causing said at least one processor to:

generate multiple individuum block structures, wherein said modifying each of the plurality of said candidate prediction model network architectures while being trained in parallel is performed for each individuum block structure.

14. The computer program product according to claim 13, wherein to select a prediction model network architecture for the current use case, the computer-readable program causes the at least one processor to:

search a library of existing prediction model network architectures previously generated for a historical use case related to the current prediction context.

15. The computer program product according to claim 13, wherein a set of said one or more model parameters applied at a respective candidate prediction model network architecture comprises: a different look back time window length parameter, a different window overlap parameter.

16. The computer program product according to claim 13, wherein the computer-readable program causes the at least one processor to:

output, via said user interface, the fittest prediction model network architecture, and present, via said user interface, an explanation of one or more most significant characteristics of the fittest prediction model network architecture.

17. The computer program product according to claim 13, wherein the computer-readable program causes the at least one processor to:

select a random set of individuums;

determine a fittest individuum from said random set; and apply random mutations to one or more candidate prediction model network architectures of the determined fittest individuum.

18. The computer-implemented method according to claim 1, wherein said characteristic features of a multivariate time series data comprises one or more of: variation, skewness, kurtosis, trend, seasonality, and a Hurst parameter.

19. The computer-implemented system according to claim 7, wherein said characteristic features of a multivariate time series data comprises one or more of: variation, skewness, kurtosis, trend, seasonality, and a Hurst parameter.

20. The computer program product according to claim 13, wherein the characteristic features of a multivariate time series data comprises one or more of: variation, skewness, kurtosis, trend, seasonality, and a Hurst parameter.

* * * * *